United States Patent [19]

Parker et al.

[11] 4,432,618
[45] Feb. 21, 1984

[54] TRAY DRIVE AND SLIDE CHANGE CONTROL APPARATUS FOR SLIDE PROJECTOR

[75] Inventors: Robert R. Parker, Wheeling; Rudolph Starai, Arlington Heights, both of Ill.

[73] Assignee: Bell & Howell Company, Chicago, Ill.

[21] Appl. No.: 336,523

[22] Filed: Dec. 31, 1981

[51] Int. Cl.$^3$ .............................................. G03B 23/04
[52] U.S. Cl. ...................................... 353/25; 353/117; 353/103
[58] Field of Search ...................... 353/25, 26 A, 27 A, 353/103, 117; 340/870.29, 825.36, 825.56; 250/231 SE

[56] References Cited

U.S. PATENT DOCUMENTS

| | | | |
|---|---|---|---|
| 3,178,998 | 4/1965 | King | 353/104 X |
| 3,895,864 | 7/1975 | Uchidoi et al. | 353/25 |
| 4,041,457 | 8/1977 | Koch | 353/26 A X |
| 4,240,066 | 12/1980 | Lenox | 340/870.29 |
| 4,353,642 | 10/1982 | Weigert | 353/25 X |
| 4,358,753 | 11/1982 | Cascini | 340/870.29 X |

FOREIGN PATENT DOCUMENTS

1937765 9/1970 Fed. Rep. of Germany ....................... 340/870.29

*Primary Examiner*—Harry N. Haroian
*Attorney, Agent, or Firm*—James V. Lapacek; Robert J. Schneider; Roger M. Fitz-Gerald

[57] ABSTRACT

Control apparatus is provided for a slide projector to accurately control rotation of a slide tray to predetermined slide positions of the slide tray and to provide integrated control of the slide change function at each slide position. The control apparatus operates in a forced mode between slide positions and operates in a servo mode to accurately position the slide tray at each of the predetermined slide positions. The detection of the slide positions utilizes a circumferential, apertured ring carried on a movable turntable that also carries the slide tray; the ring including a single incremental position aperture corresponding to each of the slide positions. Dual photodetectors are positioned at a sensing station to sense the respective slide position apertures, to provide differential position feedback detection signals in a servo loop, to interrupt the forced mode of operation and for controlling the stopping and positioning of the slide tray to a selected slide position in the servo mode. The control apparatus is operable by a forward/reverse selector switch in a first manual arrangement. Further, the control apparatus is also operable to advance to successive slide positions in response to a control signal derived as a tape advance signal from a cassette tape at variable, preprogrammed intervals. A random access slide projector is provided in another arrangement with the control apparatus being actuated either by decoded slide addresses from a program tape, or by the direct input from a local or remote keyboard.

23 Claims, 14 Drawing Figures

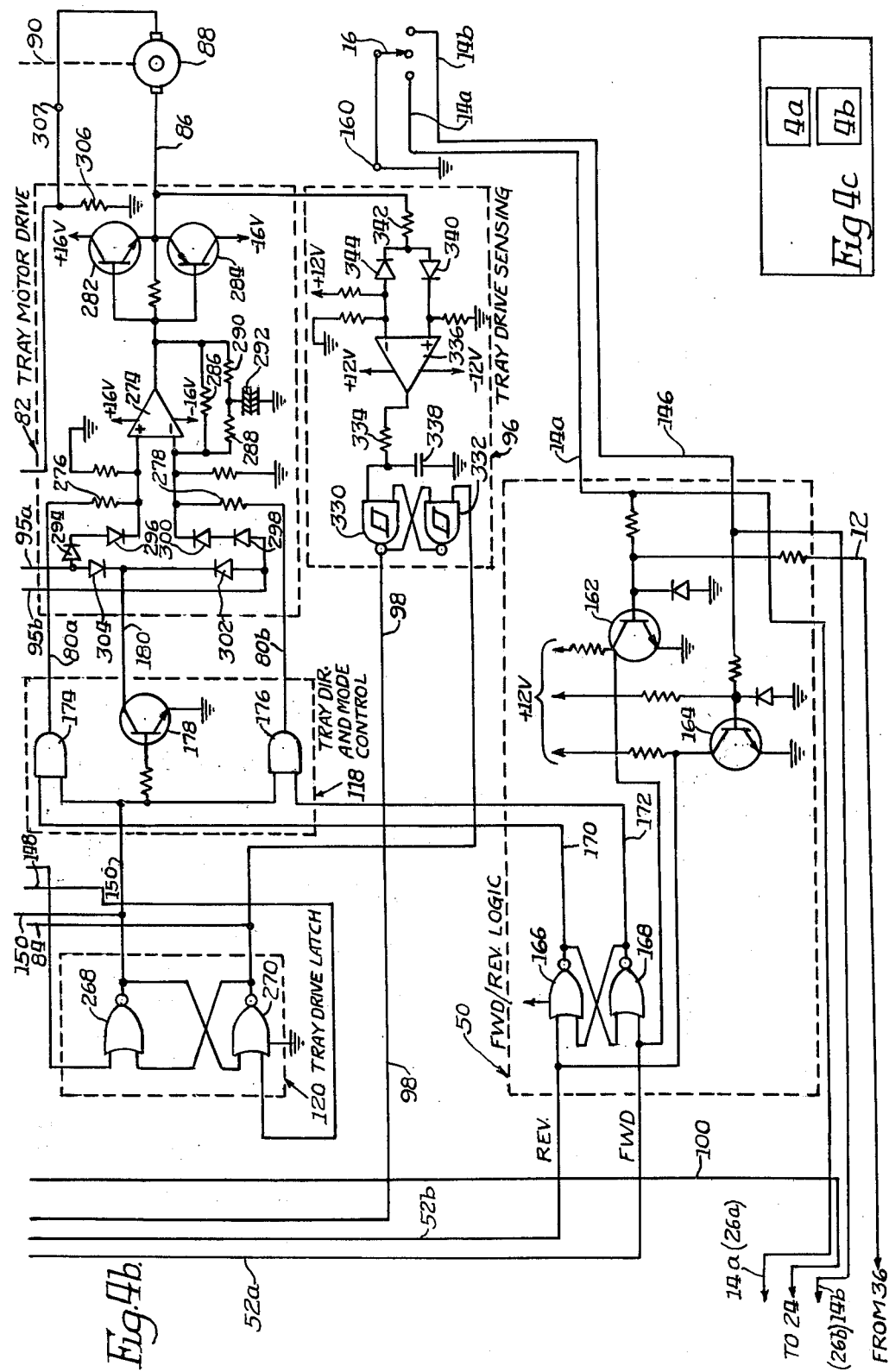

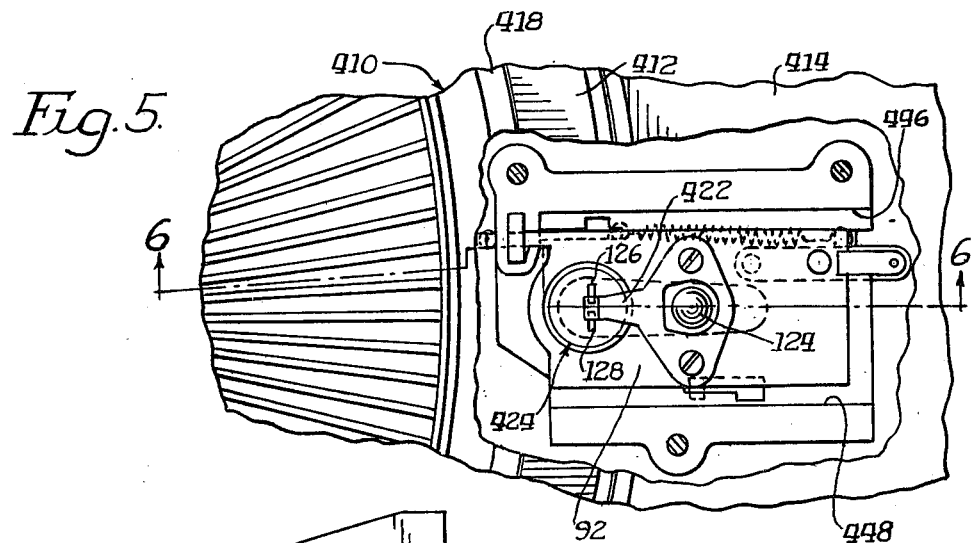
Fig. 5.
Fig. 6.
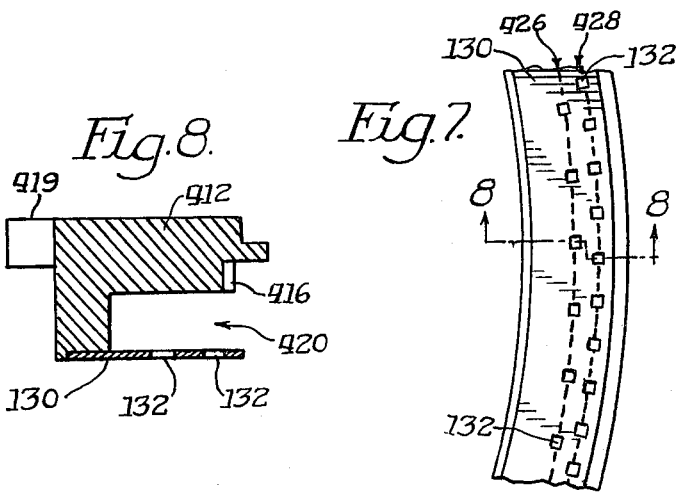
Fig. 8.
Fig. 7.

Fig. 10.

| WAVE FORM NO. | FORWARD IN OUT | REVERSE IN OUT | WAVE FORM NO. | FORWARD IN OUT | REVERSE IN OUT |
|---|---|---|---|---|---|
| 162 (144, 52a) | +6 +12 0 0 | — — | 334 | | SAME |
| 164 (14b, 52b) | | +6 +12 | 332 (IN), 330 (OUT) | | |
| 168, 166 | | | 192 | | |
| 166, 168 | — — | | 186 | | |
| 182 | | | (136, 138) | | |
| 184 | | | 114 | | |
| 186 | | | 216 (62) | | |
| (136, 138) | | | 234 | | |
| 114 | | | 244 | | |
| 216 (62) | | | 242 | | |
| 232 | | | 194 | | |
| 238 | | | 210 | | |
| 242 | | | | | |
| 194 | | | | | |
| 210 (146, 138) | | | | | |
| (148, 150) | | | | | |
| 174 | | — — | | | |
| 176 | — — | | | | |
| 274 (86) | (A8+) | (A8-) | | | |
| CURRENT TO (126, 128) | LIGHT CURRENT / CURRENT | | | | |
| 258 | | | | | |
| 254 | | | | | |
| 250 | | | | | |
| 252 | | | | | |
| 268 | | | | | |
| 118 | | — — | | | |
| 176 | — — | | | | |
| 274, (86) | (A8+) +12 | 0 -12 | | | |
| 178 (152, 180) | +12 0 | -12 | | | |

TRAY DRIVE AND SLIDE CHANGE CONTROL APPARATUS FOR SLIDE PROJECTOR

BACKGROUND OF THE INVENTION

A. Field of the Invention

The present invention relates generally to slide projectors and more particularly to control apparatus for tray drive and slide change functions of a slide projector wherein servo operation of the tray drive position is achieved by dual photodetectors and position apertures provided on a circumferential, coded aperture ring corresponding to the respective slide tray positions.

B. Description of the Prior Art

Various control apparatus are known for slide projectors to control positioning of the slide tray to a slide position and the operation of a slide changer to present the slide to a viewing position. These various control apparatus are controllable in either a manual mode or a random access mode. Arrangements of this type, for example, are disclosed in U.S. Pat. Nos. 3,296,727, 3,225,652, 3,299,554, 3,895,864, 3,907,414, 3,924,942, 3,566,370, 4,041,457, 3,510,215, 3,644,027, 3,733,122, 3,652,155, 3,623,803, 3,700,320 and 3,732,546.

While the above described control apparatus of the prior art are generally suitable for their intended use, it would be desirable to more accurately control slide tray positioning and provide the integrated control of slide tray movement and slide changer movement.

SUMMARY OF THE INVENTION

Accordingly, it is a principal object of the present invention to provide control apparatus for slide tray positioning wherein accurate control of slide positioning is achieved in a servo mode utilizing the differential output of dual photodetectors and a single incremental slide position aperture corresponding to each of the slides in a slide tray, the respective apertures being disposed on a circumferential coded ring carried by the slide tray turntable.

It is another object of the present invention to provide control apparatus for a slide projector to accurately control slide tray positioning to a corresponding slide position wherein a forced mode of operation moves the slide tray from slide position to slide position and a feedback sensing circuit utilizing dual photodetectors and position apertures corresponding to each slide tray position interrupts the forced mode operation and initiates servo mode operation to accurately position and stop the slide tray in a predetermined accurately aligned slide position.

It is yet another object of the present invention to provide control circuitry for the accurate positioning of a slide tray to a slide position utilizing a servo loop controlled by the feedback signals from dual photodetectors arranged in a predetermined relationship along the path of travel of an apertured, circumferential coded ring.

Briefly, these and other objects of the present invention are achieved by providing control apparatus for a slide projector to accurately control rotation of a slide tray to predetermined slide positions of the slide tray and to provide integrated control of the slide change function at each slide position. The control apparatus operates in a forced mode between slide positions and operates in a servo mode to accurately position the slide tray at each of the predetermined slide positions. The detection of the slide positions about the slide tray utilizes a circumferential, apertured ring carried on a movable turntable that also carries the slide tray; the ring including a single incremental position aperture corresponding to each of the slide positions. Dual photodetectors are positioned at a sensing station to sense the respective slide position apertures and to provide feedback detection signals for interrupting the forced mode of operation and for controlling the stopping and positioning of the slide tray to a selected slide position in the servo mode. The outputs of the dual photodetectors are utilized as differential position feedback signals in a servo loop. The dual photodetectors are positioned in a predetermined relationship with respect to the aperture geometry and in a direction along the path of the slide tray travel. The control apparatus is operable by a forward/reverse selector switch in a first manual arrangement wherein control signals provide successive slide position advancement in either the forward or reverse direction. Further, the control apparatus is also operable to advance to successive slide positions in response to a control signal derived as a tape advance signal from a cassette tape at variable, preprogrammed intervals. A random access slide projector is provided in another arrangement with the control apparatus being actuated either by decoded slide addresses from a program tape, or by the direct input from a local or remote keyboard.

The invention both as to its organization and method of operation together with further objects and advantages thereof will best be understood by reference to the following specification taken in conjunction with the accompanying drawings.

BRIEF DESCRIPTION OF THE DRAWINGS

FIGS. 4a and 4b when combined as shown in FIG. 4c form a logic and schematic diagram of the control apparatus of FIG. 2;

FIG. 5 is a plan view of portions of the control apparatus of FIGS. 1, 2 and 4 with portions cut away for clarity, illustrating the turntable carrying the slide tray, the coded aperture slide position ring and the feedback sensing arrangement of the control apparatus;

FIG. 6 is a sectional view of the apparatus taken along the line 6—6 of FIG. 5;

FIG. 7 is a fragmentary view illustrating the coded aperture ring and turntable of the control apparatus of FIGS. 1 through 4;

FIG. 8 is a sectional view of the apparatus taken along the line 8—8 of FIG. 7;

FIG. 10 is a graphical representation illustrating signal waveforms at various locations in the control apparatus of FIGS. 1 through 4;

DETAILED DESCRIPTION OF THE PREFERRED EMBODIMENT

Figure 1:
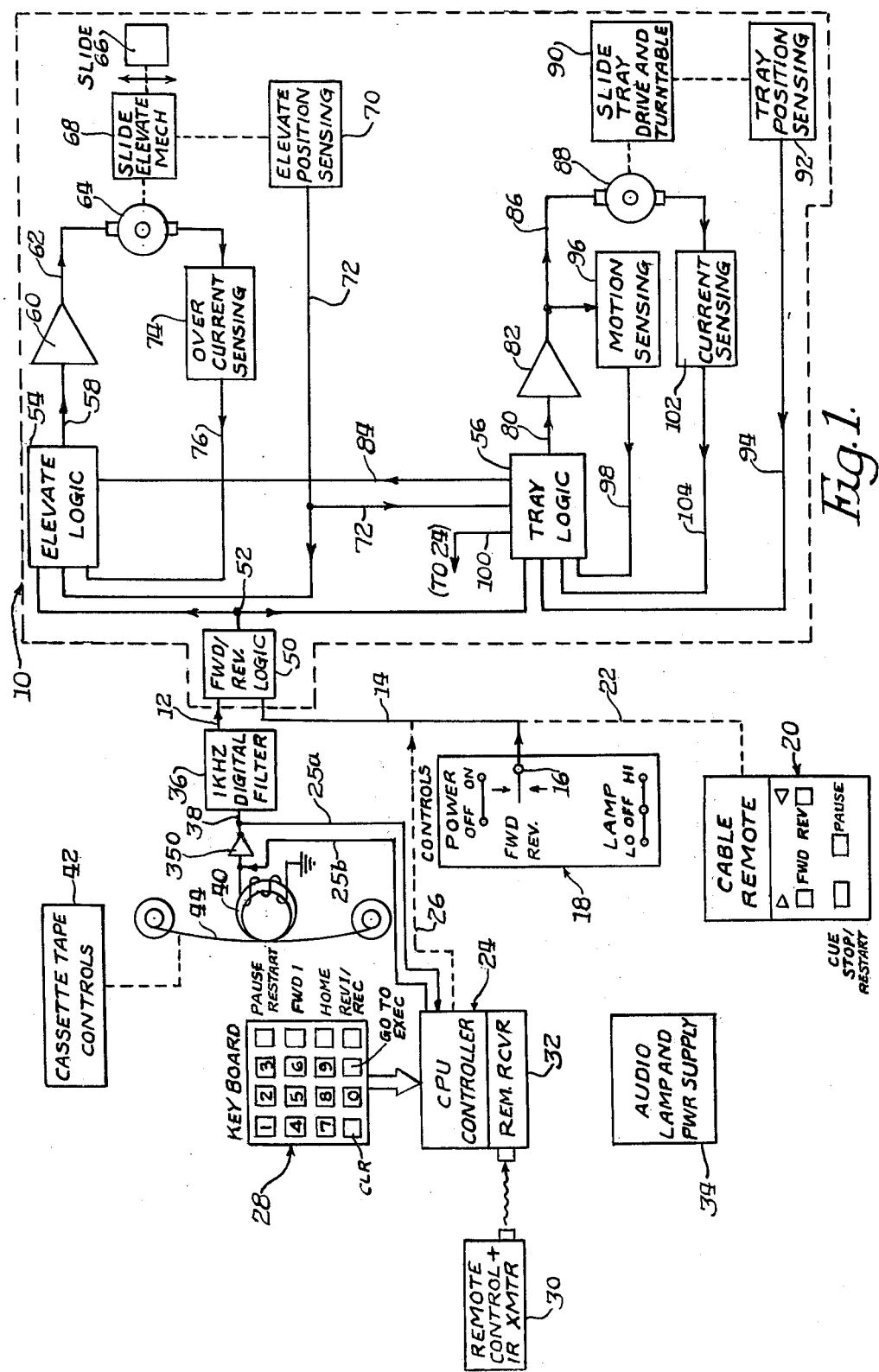
FIG. 1 is a block diagram representation of the control apparatus of the present invention for operation of a slide projector.

Referring now to FIG. 1, the control apparatus 10 of the present invention for the control of a slide tray drive and slide change operation in a slide projector is illustrated in operable configuration with various controls of a slide projector. The control apparatus 10 in response to control signals at 12, 14 controls rotation of a slide tray carried by the projector and operation of a slide change mechanism to control movement of a slide adjacent the slide projection station between a viewing position and a slide tray position.

The control signals at 14 provide digital signals on one or more lines representing a forward or reverse mode of slide tray movement to which the control apparatus 10 is responsive to appropriately move the slide tray to a desired position. The control signal 12 represents a slide advance signal derived from a program tape to which the control apparatus 10 is responsive to advance the slide tray by one slide position in response to each occurrence of the signal 12.

While it should be understood that the control apparatus 10 of the present invention of FIG. 1 is operable to appropriately control slide tray movement and slide change operation in many different varieties of projector apparatus, the basic operation of the control apparatus 10 will be described in combination with the projector and associated control portions as illustrated in FIG. 1.

In one arrangement of the projection apparatus, the control signals at 14 are provided from a forward-/reverse tray advance control switch 16 of a local control panel 18. The local control panel 18 also includes an on/off power switch and a lamp mode control switch. The control signals at 14 are also capable of being provided from a remote control unit 20 over a remote cable interconnection 22. The remote control unit 20 includes forward and reverse slide advance controls.

The advance control signal 12 is provided by a digital filter stage 36. The digital filter stage 36 receives an audio input 38 from a tape transducing head 40 through a preamplifier 350. The tape transducing head 40 is associated with a cassette tape arrangement including appropriate controls referred to generally at 42. A cassette tape 44 includes 1 KHz sinewave or encoded advance bursts that are decoded by the digital filter stage 36 to provide desired advance control signals at 12 in accordance with the desired program recorded on the cassette tape 44. The cassette tape 44 also includes recorded narrative information on a separate track from the track including the recorded advance burst information. The narrative track information is transduced and provided by audio circuitry in an audio, lamp, and power supply circuitry stage referred to generally at 34. Thus, a synchronized narrative program and slide advance is provided in timed relationship.

In another arrangement of the projection apparatus of FIG. 1, a CPU controller 24 provides control signals at 14 over an interconnecting signal path 26. The CPU controller 24 is responsive to the inputs from a keyboard 28 to provide random access operation of the control apparatus 10. A desired slide number is inputted on the keyboard 28 and the CPU controller 24 determines the appropriate rotation of the slide tray by control apparatus 10 that is required to bring the desired slide to the slide changer viewing position as will be explained in more detail hereinafter. The CPU controller 24 is also responsive to encoded slide address signals on the cassette tape 44 defining specific slide numbers in the slide tray. The CPU controller decodes the encoded slide address signals on a data line 25a connected at the output of the preamplifier stage 350 and provides the control signals at 14 via the interconnecting signal path 26 for random access operation in accordance with the recorded program cassette tape. The CPU controller 24 also provides for the recording of program cassette tapes over a data line 25b connected to the output of the transducing head 40 in response to inputs from the keyboard 28 in a program record mode by recording the corresponding encoded slide address signals in a burst signal format on the program tape 44. Thus, in the arrangement of the projection apparatus utilizing a CPU controller 24, the digital filter stage 36 is not utilized and the output 12 is not functional; the CPU controller 24 performing all the required decoding of the encoded slide address signals on the program cassette tape 44.

In the arrangement of the projector apparatus utilizing a CPU controller 24, the forward/reverse control 16 of local control 18 is deleted and forward and reverse keys are provided on the keyboard 28. The remote control unit 20 is also not utilized. The projection apparatus with the CPU controller 24 is also operable to provide the control signals at 14 over the signal path 26 by means of a wireless remote control transmitter unit 30 and a receiver 32. The remote control transmitter 30 and receiver 32 operate, for example, on the basis of infrared energy transmission. The receiver 32 responds to the transmitted signals from the transmitter 30 and provides desired slide information as data signals to the CPU controller 24. In a specific arrangement, the remote control and transmitter unit 30 is provided with a keyboard such as the keyboard 28 such that complete functioning and control of the controller apparatus 10 is provided by the remote control transmitter unit 30. For a more detailed discussion of the operation of the CPU controller 24 and associated control functions, reference may be made to U.S. application Ser. Nos. 336,524 and 336,522 filed by R. Parker et al. on Dec. 31, 1981.

In accordance with important aspects of the present invention, the control apparatus 10 includes a forward-/reverse logic stage 50 that is responsive to the mode advance control signals 12, 14. The forward/reverse logic stage 50 generates forward and reverse mode signals 52 to a slide elevate logic stage 54 and a slide tray logic stage 56 in accordance with the state of the input signals 12, 14. In response to a forward or reverse mode signal from the output 52, the elevate logic stage 54 is set to slide elevate mode and provides an output at 58 to a slide elevate motor drive amplifier 60. The motor drive amplifier 60 at output 62 drives the slide elevate motor 64 to elevate a slide 66 in the projection position to an upward slide tray position through operation of a slide elevate mechanism 68. The slide elevate mechanism 68 (not shown in detail) receives a unidirectional input from the slide elevate motor 64 to drive a reversible feed screw or endless worm arrangement similar in general respects to the drive arrangement of U.S. Pat. No. 3,353,443 and described in detail in U.S. application Ser. No. 336,470 filed by N. Mischenko on Dec. 31, 1981.

During normal steady state operation of the projector apparatus including initial power-up of the system and between slide changes, the elevate logic 54 is conditioned with the slide elevate mechanism 68 in the downward slide projection position with a slide 66 in the projection position. Thus, for selection of a new slide for projection in the single slide advance mode, random access slide programming mode, or rapid search mode between various slide tray positions, the basic operational cycle begins with elevation of the particular slide presently in the projection position back into the upward tray position, and proceeds with the controlled rotation of the slide tray by one or more slide positions and finishes with the lowering of the desired slide for presentation into the projection position by operation of the slide elevate motor 64.

An elevate position sensing arrangement 70 is appropriately positioned proximate the slide elevate mechanism 68 and includes up and down limit sensing switches to detect predetermined movement of the slide elevate mechanism 68 between a predetermined tray position and a predetermined projection position at the slide elevation station. The elevate position sensing arrangement 70 provides outputs at 72 to the elevate logic stage 54 to terminate operation of the elevate signal 58 and thus appropriately drive the slide elevating mechanism 68 between the predetermined up and down positions. A current sensing stage 74 monitors current through the slide elevate motor 64 and provides at output 76 a disable control signal to the elevate logic stage 54 in the event of sensed current of an excessive value. The elevate logic stage 54 responds to an excessive current condition at 76 to terminate the drive signal to the slide elevate motor 64.

After the slide presently in the projection position has been elevated to the slide tray position, the control apparatus 10 proceeds to the slide tray movement mode wherein the slide tray is moved by one or more positions in an appropriate forward or reverse direction in response to the forward/reverse logic stage 50.

Specifically, the signal 72 from the elevate position sensing arrangement 70 is connected as an input to the slide tray logic stage 56. The slide tray logic stage 56 in response to the signal at 72 is conditioned to the tray drive mode. In response to the status of the forward or reverse mode signal 52 as an input to the slide tray logic stage 56, the slide tray logic stage 56 outputs at 80 an appropriate forward or reverse tray drive signal to a tray motor drive amplifier 82. The slide tray logic stage 56 also includes a mode select latch operable in either a forced mode or a servo mode. Additionally, the slide tray logic stage 56 provides a mode control output 84 to disable the elevate logic stage 54 to insure disabling of the elevate function when the slide tray logic 56 is conditioned to the forced mode.

In response to the tray drive signal 80, the slide tray motor drive amplifier 82 at output 86 provides a drive signal of appropriate polarity to operate a slide tray motor 88 in either the forward or reverse direction. The slide tray motor 88 is operatively coupled to appropriately drive a slide tray drive and turntable arrangement 90 in the corresponding forward or reverse direction.

The slide tray drive and turntable arrangement 90 includes a circumferential apertured ring with one aperture corresponding to each respective slide tray position as illustrated in FIGS. 7 and 8 and described in more detail hereinafter. A slide tray position sensing arrangement 92 is disposed in the path of travel of the circumferential coded aperture ring of arrangement 90.

The slide tray position sensing arrangement 92 includes a light source and two photodetectors all as shown in more detail in FIGS. 2, 4, 5 and 6. The two photodetectors are arranged in predetermined spaced relationship along the circumferential path of travel of the aperture configuration so as to provide differential output sensing of each of the apertures as each respective aperture is moved within the operating range of the dual photodetectors. Dependent upon the direction of slide tray rotation, as the aperture approaches the dual photodetector station, one of the photodetectors will receive illumination of a higher magnitude than the other photodetector. Further, when the aperture is arranged directly over the midpoint between the two photodetectors, the photodetectors receive equal illumination through the aperture. The outputs at 94 from the differential photodetectors of the sensing arrangement 92 are connected to the slide tray logic stage 56 to provide appropriate servo loop feedback control signals to accurately position the slide tray in a desired position.

In accordance with important aspects of the present invention, the control apparatus 10 by means of the slide tray logic stage 56 is operable in a first forced mode of operation in the tray drive mode during which the slide tray logic stage 56 by means of output signal 80 drives the slide tray motor 88 between one or more slide positions as dependent upon the input signal 52.

If the input signal 52 remains in either a high forward or reverse signal state, the slide tray logic 56 is maintained in a forced mode for rapid search or random access with movement of the slide tray and turntable between the present slide position and a desired slide position. When the control signal 52 is generated for a single slide advance in the forward or reverse direction, the forced mode of operation by means of the slide tray logic stage 56 and signal 80 provides for forced mode control movement of the slide tray between the present slide position and the next successive slide position.

The forced mode of operation is terminated for a single advance slide situation when the slide tray position sensing arrangement 92 by means of output signals 94 senses the next slide position. In response to the sensed condition at signal 94, the slide tray logic stage 56 terminates forced mode operation and is then operable in the servo mode of operation under the control of the outputs at 94 from the dual photodetector devices to accurately position the slide tray and turntable 90 at the next slide position. The forced mode of operation is similarly terminated and the servo mode of operation initiated during random access or rapid search situations after the control signal 52 is terminated and upon the next occurrence of the signal 94 from the slide tray position sensing arrangement 92.

The control apparatus 10 also includes a motion sensing stage 96 that is responsive to the slide tray motor control voltage 86 and that provides an output at 98 to the slide tray logic stage 56. The output at 98 indicates that the slide tray has moved, stopped and locked on to the appropriate slide tray position in the servo mode. The slide tray logic 56 responds to the input signal 98 and generates an output at 84 to the elevate logic 54 to set the elevate logic 54 to the enable mode to allow downward positioning of the slide by the elevate mechanism 68 to lower the slide at the elevate station into projection position after tray movement has terminated. Further, the slide tray logic stage 56 upon entering the servo mode has been disabled or reset from the tray drive mode.

The slide tray logic stage 56 outputs at 100 a slide count signal for use by projection apparatus including the CPU controller 24 to provide incremental slide position movement information to the controller 24.

The incremental position signal 100 is provided to the CPU controller 24 since no absolute position information is available in the preferred embodiment of the tray position sensing arrangement of the control apparatus 10. Thus, in response to a known start position and the incremental position signals at 100, the CPU controller 24 stores the present position of the slide tray.

The control apparatus 10 also includes a tray drive motor current sensing stage 102 that monitors current through the slide tray motor 88 and provides an excessive current signal 104 to the slide tray logic stage 56. the slide tray logic stage 56 in response to the excessive current signal 104 terminates tray drive movement by terminating the tray movement signal 80.

Figure 2:
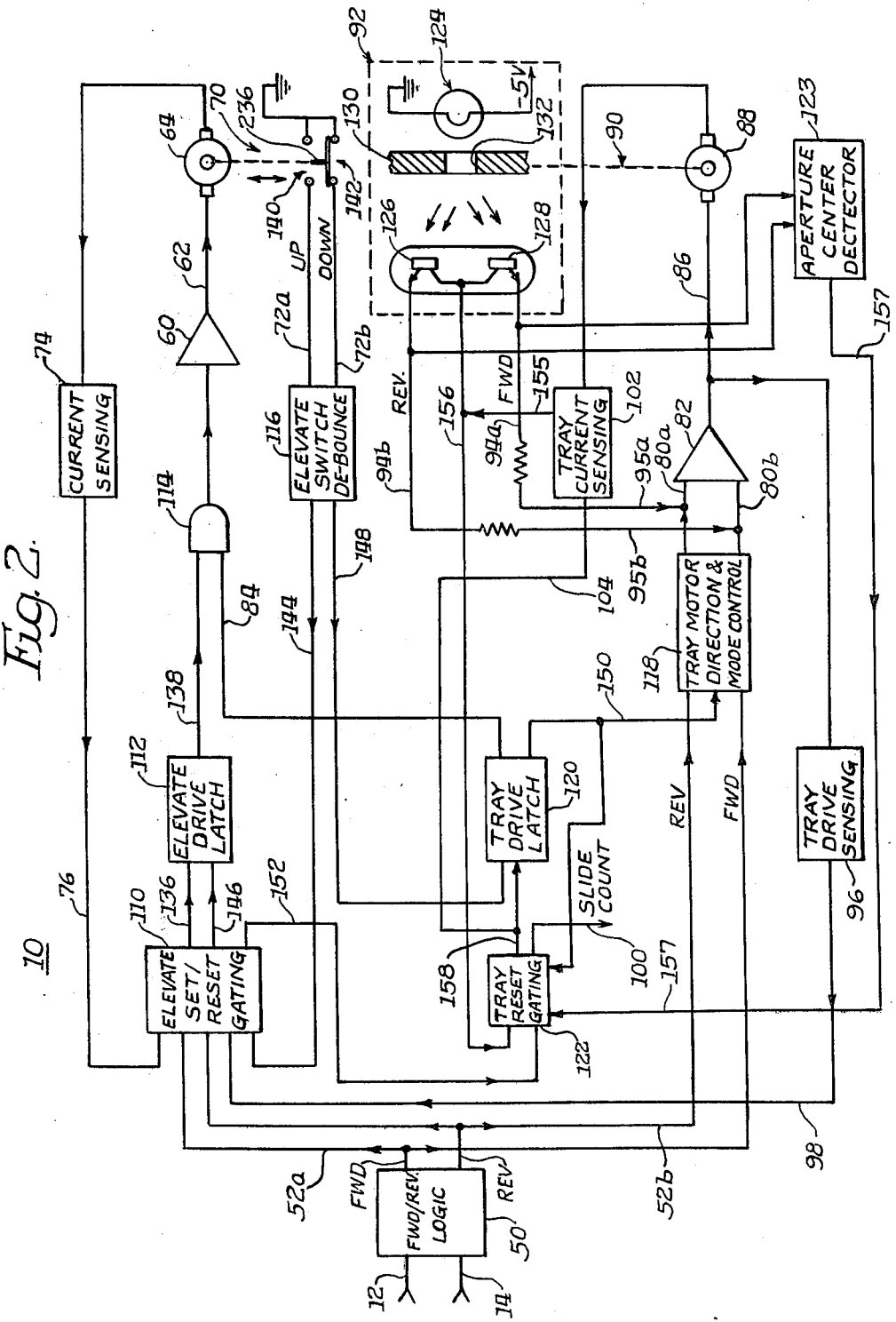
FIG. 2 is a more detailed block diagram representation of the control apparatus of the present invention of FIG. 1.

Referring now to FIG. 2 and considering the detailed structure and operation of the control apparatus 10 of the present invention, the forward/reverse logic stage 50 in response to the input signals 12, 14 provides a forward mode signal 52a and a reverse mode signal 52b with either the forward or reverse signal being active as dependent upon the state of the input signals 12, 14. As illustrated in FIG. 2, the elevate logic stage 54 includes an elevate/reset gating stage 110, an elevate drive latch stage 112 and an elevate/tray interlock stage 114. Similarly, the slide tray logic 56 of FIG. 1 as illustrated in FIG. 2 includes a tray direction and mode control stage 118, a tray drive mode select latch 120, a tray reset gating stage 122, and an aperture center detector stage 123. Additionally, like elements in FIGS. 1 and 2 are designated by like reference numerals.

The slide tray position sensing arrangement 92 of FIG. 2 depicts the light source 124, in appropriate positional relationship with the dual photodetectors 126, 128. A partial edge view of the coded aperture ring of the turntable arrangement 90 is illustrated in operative position with the light source 124 and the two photodetectors 126, 128. An aperture 132 of the coded ring 130 is also shown in the aligned position midway between the photodetectors 126, 128 and aligned with the light source 124 corresponding to the at-rest, servo mode position wherein equal illumination is received by both photodetectors 126 and 128. The output 94a of the photodetector 128 is connected through a series resistor to provide the output signal 95a for connection with the forward drive signal 80a to the tray motor drive amplifier stage 82. The output 94a is also directly connected to the aperture center detector stage 123. Similarly, the output 94b of the photodetector 126 is connected through a series resistor to provide the output signal 95b for connection with the reverse drive signal 80b. The output 94b is also directly connected to the aperture center detector stage 123.

The elevate/reset gating stage 110 in response to an active signal on either the forward mode line 52a or the reverse mode line 52b sets the elevate drive latch 112 over line 136 to the elevate enable mode. With the elevate drive latch 112 in the elevate enable mode, an elevate drive signal output 138 of the latch 112 is coupled through an elevate/tray interlock gate 114 to activate the elevate motor drive 60 and thus provide movement of the elevate motor 64 to elevate a slide from the projection position to the slide tray position. The elevate/tray interlock stage 114 is implemented in a specific embodiment by an AND gate with the signal 138 as one input to the AND gate 114. The second input to the AND gate 114 is connected to the elevate mode enable signal 84 outputted from the tray drive mode select latch 120 of the slide tray logic 56.

Upon movement of the elevate motor 64 to move the slide up into the slide tray position, an up limit switch 140 of the elevate position sensing arrangement 70 is closed to provide a signal at 72a to the elevate switch debounce stage 116. The elevate position sensing arrangement 70 also includes a down limit sensing switch 142 which is closed when the elevate motor 64 moves the slide elevate mechanism 68 to the downward projection position with a corresponding down limit signal transition 72b being supplied to the elevate switch debounce sstage 116.

The elevate switch debounce stage 116 in response to a closure of either switch 140 or 142 indicated by the respective input 72a, 72b provides a switch transition output signal 144 to the elevate/reset gating stage 110. The elevate/reset gating stage 110 in response to the switch transition signal at 144 provides an output signal at 146 to reset the elevate drive latch 112 to disable the elevate drive signal 138 thus terminating the upward slide elevate mode. The elevate switch debounce stage 116 in response to closure of the up limit switch 140 at input 72a also provides a switch transition signal at output 148 to set the tray drive mode select latch 120 to the tray drive mode.

The tray drive mode select latch 120 in response to the signal at 148 provides the disabling control signal 84 and further provides a tray drive enable signal 150 to the tray direction and mode control stage 118. When enabled by the tray drive signal 150, the tray direction and mode control stage 118 in accordance with either the forward mode signal 52a or the reverse mode signal 52b being active provides the appropriate corresponding forward drive signal 80a or reverse drive signal 80b to the tray motor drive amplifier 82 to actuate the tray motor 88 to move the slide tray. The tray drive enable signal 150 from the latch 120 also disables servo mode operation of the tray direction and mode control stage 118.

The elevate/reset gating stage 110 provides a forced mode sustaining signal 152 to the tray reset gating stage 122 in response to the active state of either the forward or reverse mode signals 52a or 52b respectively. It will be remembered that in a random access or rapid search mode, one of the corresponding mode signals 52a or 52b will remain active. On the other hand, in a single slide advance condition, the mode signals 52a or 52b will remain active for only a relatively short time duration and will be inactive during the remaining time in which the tray drive latch 120 is in the tray drive enable mode. Thus, if the forced mode sustaining signal 152 is active, the tray direction mode control stage 118 continues to provide either the forward drive signal 80a or the reverse drive signal 80b to the tray motor drive amplifier stage 82.

Thus, if the tray direction and mode control stage 118 is controlled in a rapid search or random access mode, one of the appropriate drive signals 80a or 80b is active to control operation of the slide tray motor 88 to move the slide tray drive and turntable 90 through the appropriate number of slide positions.

When the desired slide position is reached for either a single slide position advance or in the rapid search or random access mode, the drive signal 80a or 80b that is active is disabled by means of the termination of the drive signal 150. The drive signal 150 is terminated when the photodetectors 126, 128 become active corresponding to the positioning of the aperture 132 in the vicinity of the sensing arrangement 92 corresponding to the desired slide position such that light from the source 124 impinges upon the photodetectors 126, 128. Current to the photodetectors 126, 128 is sourced by means of a common supply line 156 from the tray reset gating stage 122.

The tray drive motor current sensing stage 102 provides a control output at 155. The control output at 155 is connected to the supply line 156 to adjust the voltage level at 156 in accordance with the frictional loading on the tray motor 88 as will be explained in more detail hereinafter in connection with FIG. 4. The control output 155 provides appropriate delay of the transition from the forced mode to the servo mode under varying load conditions.

When the photodetectors 126, 128 begin to conduct in response to light impinging thereon from the source 124 through the aperture 132, the tray reset gating stage 122 in response to the signal level at 156 provides a tray drive reset signal at 158 to reset the tray drive mode select latch 120 and terminate the signal 150. Further, if the elevate/reset gating stage 110 detects a continued force drive mode signal on either of the lines 52a or 52b corresponding to rapid search or random access mode, the signal 152 is active to prevent the tray reset gating stage 122 from generating the reset signal 158.

Thus, in the single advance slide situation or in the random access or rapid search mode after the desired position has been reached and the signals 52a, 52b are inactive, the forced mode signal of 80a or 80b is inactive and the servo mode signals 94a, 94b are active to accurately position and stop the slide tray in the desired aligned slide tray position with the slide in the corresponding slide tray position aligned with the slide elevate mechanism 68.

In the case of a single slide advance, the drive signal 150 is utilized by the tray reset gating stage 122 as a temporary servo mode inhibit signal. In this way, the servo mode is temporarily inhibited for a predetermined time interval after the occurrence of the drive signal 150 as will be explained in more detail hereinafter in connection with FIG. 4.

When the tray drive motion sensing stage 96 detects the appropriate sequence of control voltage changes at output 86 to the tray motor 88, the signal 98 is generated to the elevate/reset gating stage 110. In response to the signal 98, the elevate/reset gating stage 110 provides the latch enabling signal 136 to set the elevate drive latch 112 to the elevate mode.

Thus, the elevate drive latch 112 when set to the elevate mode provides the elevate enable signal 138 through the elevate tray interlock gate 114 to provide operation of the elevate motor 64 with the slide elevate mechanism in the up position to lower the slide to the down or projection position.

When the down limit switch 142 is actuated by the slide elevate mechanism 68 with the slide in the down projection position, the elevate switch debounce stage 116 in response to the switch transition at 72b provides the switch transition signal 144 to the elevate/reset gating stage 110 which in turn by means of output 146 resets the elevate drive latch 112 to terminate elevate operation. At this point the stable, ready state operating condition of the control apparatus 10 has been reached with the desired slide in the projection position. The control apparatus 10 now remains in this state until another slide advance control is received by the forward/reverse logic stage 50.

The tray reset gating stage 122 provides the slide count pulse signal at 100 for the CPU controller 24 (where utilized) at the time when the current through line 156 is detected which indicates the approach of an aperture.

The aperture center detector stage 123 in response to the photodetector output signals 94a, 94b provides at output 157 a pulse control signal to the tray reset gating stage 122. The pulse control signal at 157 is utilized by the tray reset gating stage 122 under high frictional loading conditions of the tray drive motor 88 to ensure initiation of the servo mode and termination of the forced mode as will be explained in more detail hereinafter in connection with FIG. 4.

Figure 4A:
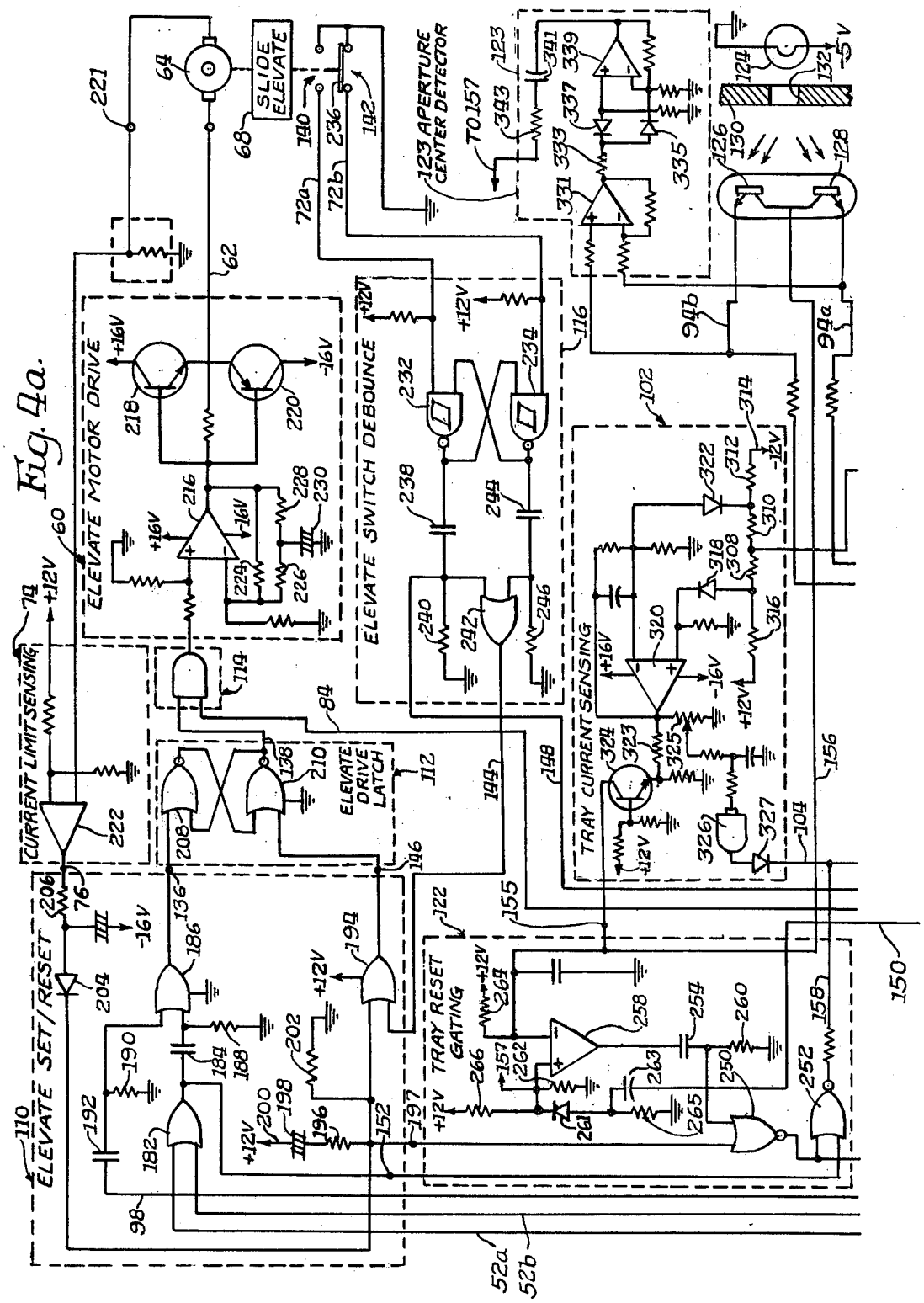

Referring now to FIG. 4 and considering now the details of a specific embodiment of the control apparatus 10 of FIGS. 1 and 2, the control signals at 14 include a forward advance control signal 14a and a reverse advance control signal 14b provided by respective contacts of the control switch 16 for projection apparatus provided with the manual advance mode control. A common connection of the switch 16 is connected to ground potential at 160.

For projection apparatus utilizing the CPU controller 24, the signal path 26 includes a forward control signal 26a and a reverse control signal 26b. The forward control signal 14a or 26a is connected to the forward-/reverse logic stage 50 through an input resistor to the base of an NPN transistor 162. The collector of the transistor 162 provides the forward control output signal 52a. The reverse control signal 14b or 26b is connected through an input resistor to an NPN transistor 164. The collector of the transistor 164 is connected to provide the reverse control output signal 52b. The automatic advance signal 12 from the digital filter 36 corresponding to program cassette tape advance is connected to the base of the transistor 162.

The forward/reverse logic stage 50 includes a direction control latch formed by two, two-input NOR gates 166 and 168. The forward control signal 52a is connected to one input of the gate 168 and the reverse control signal 52b is connected to one input of the gate 166. The output of the gate 166 is connected to the second input of the gate 168 and the output of the gate 168 is connected to the second input of the gate 166. The output of the gate 166 forms a forward directional mode latch signal 170 and the output of the gate 168 forms the reverse directional mode latch signal 172. The latch directional signals 170 and 172 are provided to the tray motor direction and mode control stage 118 in lieu of the respective control signals 52a, 52b of FIG. 2.

The tray motor direction and mode control stage 118 includes a first two-input AND gate 174 having one input connected to the forward signal 170 and a second input connected to the tray drive enable signal 150 from the tray drive latch 120. A second two-input AND gate 176 includes a first input connected to the reverse mode signal 172 and a second input connected to the tray drive enable signal 150. A servo mode disable transistor 178 includes a base lead connected through an input resistor to the tray drive enable signal 150. The collector of the transistor 178 is connected to provide an output 180 as a servo drive disable control signal to the tray motor drive 82. The emitter of the transistor 178 is connected to ground potential.

The forward and reverse control signals 52a and 52b are each connected to one input of a two-input OR gate 182 of the elevate/reset gating stage 110. The output of the OR gate 182 forms the forced mode sustaining signal 152. The output of the OR gate 182 is connected through a capacitor 184 to one input of a two-input OR gate 186. The output of the OR gate 186 forms the elevate latch enable signal 136 connected to the elevate drive latch 112. A resistor 188 is connected between ground potential and the junction between the capacitor 184 and the first input to the gate 186. A second input to the gate 186 is connected to ground potential through a resistor 190. The second input of the gate 186 is also connected through a capacitor 192 to the control output 98 of the tray drive motion sensing stage 96.

Another two-input OR gate 194 of the elevate/reset gating stage 110 includes a first input connected to the switch transistion output 144 of the elevate switch debounce stage 116. The second input of the OR gate 194 is connected through the series combination of a resistor 196 and a capacitor 198 to a +12 V supply line 200. The second input of the gate 194 is also connected to ground potential through a resistor 202. The second input of the gate 194 is also connected through a diode arranged cathode to anode and a resistor 206 to the output 76 of the current limit sensing stage 74.

The elevate latch enable signal 136 is connected to a first input of a two-input NOR gate 208 of the elevate drive latch 112. The output of the NOR gate 208 is connected to one input of a two-input NOR gate 210. The second input of the NOR gate 210 is connected to the elevate latch reset signal 146. The output of the NOR gate 210 is connected to the second input of the NOR gate 208 to form a latch arrangement of the gates 208 and 210. The output of the NOR gate 210 is connected to provide the elevate enable signal 138 to the elevate tray interlock gate 114 as one input to the two-input AND gate 114. The second input to the AND gate 114 is the enable signal 84 from the tray drive latch stage 120.

The output of the elevate tray interlock gate 114 drives the elevate motor drive amplifier stage 60 by connection through a series resistor to an operational amplifier stage 216 at the noninverting input of the amplifier. The output of the amplifier 216 is coupled to a push-pull output stage including transistors 218 and 220. The common emitter connection of the transistors 218 and 220 provides the elevate drive signal output 62 to the elevate motor 64. The other end 221 of the motor 64 is connected to the noninverting input of an amplifier 222 of the current limit sensing stage 74 for the elevate motor. The output of the elevate motor drive amplifier 216 is connected to the inverting input of the amplifier 216 through a resistor 224. Connected across the resistor 224 is a series combination of two resistors 226 and 228. The junction of the resistors 226 and 228 is connected to ground potential through a braking control capacitor 230 whose function will be explained in more detail hereinafter.

The elevate switch debounce stage 116 includes a latch formed by two, two-input NAND gates 232 and 234. One input of the gate 232 is connected to the up-limit switch signal input 72a from the up-limit switch 140. One input of the gate 234 is connected to the down-limit switch input signal 72b from the down-limit switch 142. The switch actuator 236 for the switches 140 and 142 is operated by the slide elevate mechanism 68. The output of the gate 232 is connected to the second input of the gate 234 and the output of the gate 234 is connected to the second input of the gate 232. The output of the gate 232 is connected through a capacitor 238 to provide the up-switch transition control signal 148. The control signal 148 is connected to ground potential through a resistor 240. The up-switch transition signal output 148 is also connected to one input of an OR gate 242. The output of the gate 242 forms the switch transition control line 144. The output of the gate 234 is connected through a capacitor 244 to the second input of the gate 242. The second input of the gate 242 is also connected to ground potential through a resistor 246.

The tray reset gating stage 122 includes a two-input NOR gate 250 having one input connected to an initialize signal 197 from the elevate reset gating stage 110. The output of the gate 250 forms the slide count output signal 100. The output of the gate 250 is also connected to a first input of a two-input NOR gate 252. The second input of the NOR gate 252 is connected to the forced mode sustaining signal 152. The output of the gate 252 is connected through a series resistor to provide the signal 158. The second input of the gate 250 is connected through a capacitor 254 to the output of an operational amplifier 258. The second input of the gate 250 is also connected through a resistor 260 to ground potential.

The noninverting input of the amplifier 258 is connected to a reference voltage provided at the junction of two resistors 262 and 266. The resistor 266 is connected to the +12 V supply and the resistor 262 is connected to ground potential. The noninverting input of the amplifier 268 is also connected to the output 157 of the aperture center detector 123. Further, the noninverting input of the amplifier 258 is connected through the series combination of a diode 261 arranged cathode to anode and a capacitor 263 to the tray drive signal 150. A resistor 265 is connected between ground potential and the junction of the diode 261 and the capacitor 263. The inverting input to the amplifier 258 is connected to the +12 V supply through a resistor 264. The inverting input of the amplifier 258 is also connected to the photodetector current source signal line 156 and to the control output 155 of the tray current sensing stage 102.

The tray drive mode select latch stage 120 includes two, two-input NOR gates 268 and 270 interconnected in a latch arrangement. The latch gate 268 includes the two signals 104 and 158 at one input. The second input of the gate 268 is connected to the output of the gate 270. The output of the gate 268 is connected to one input of the gate 270. The second input of the gate 270 is connected to the up-switch transition signal output 148. The output of the gate 268 provides the tray drive control enable signal 150 to the tray motor direction and mode control stage 118. The output of the gate 270 is connected to provide the elevate control signal 84.

The tray motor drive stage 82 includes an amplifier 274 having a noninverting input connected through a series resistor 276 to the forward drive signal 80a and an inverting input connected through a series resistor 278 to the reverse drive signal 80b. The output of the amplifier 274 is connected to a push-pull output stage including transistors 282 and 284. The common emitter output of the transistors 282 and 284 is connected to the motor control signal 86 to the slide tray motor 88. The feedback resistor 286 is connected between the output of the amplifier 274 and the inverting input. Two resistors 288 and 290 are connected across the resistor 286. A capacitor 292 is connected between a junction of the resistors 288 and 290 and ground potential. The control output 95a of the forward photodetector 128 is connected through the series combination of two diodes 294 and 296 arranged anode to cathode to the noninverting input of the amplifier 274.

Similarly, the control output 95b of the reverse photodetector 126 is connected through the series combination of two diodes 298 and 300 arranged anode to cathode to the inverting input of the amplifier 274. The servo inhibit and disable signal 180 from the tray motor direction and mode control stage 118 is connected to the junction of the cathodes of the two diodes 302 and 304. The anode of the diode 302 is connected to the reverse servo control signal 95b and the anode of the diode 304 is connected to the forward servo control signal 95a. A resistor 306 is connected between ground potential and the second end 307 of the tray motor 88.

The motor circuit line 307 is also connected to the junction of two resistors 308 and 310. The other end of resistor 310 is connected through a resistor 312 to the −12 V supply line 314. The second end of the resistor 308 is connected through a resistor 316 to the +12 V supply. Resistors 308, 310, 312 and 316 are provided in the current sensing path of the tray motor current sensing stage 102. The junction of resistors 308 and 316 is connected through a diode 318 arranged anode to cathode to the noninverting input of an amplifier 320 of the tray motor current sensing stage 102. The junction of the resistors 310 and 312 is connected through a diode 322 arranged cathode to anode to the inverting input of the amplifier 320.

The output of the amplifier 320 is connected through a series resistor 323 to the emitter of an NPN transistor 324. The collector of the transistor 324 provides the control output 155 to the tray reset gating stage 122. The emitter of the transistor 324 is also connected to ground potential through a resistor. The base of the transistor 324 is connected to the junction of two resistors that are connected in series between the +12 V supply and ground potential. The output of the amplifier 320 is also connected to one end of a potentiometer 325. The other end of the potentiometer 325 is connected to ground potential. The wiper arm or tap of the potentiometer 325 is connected through two series resistors to a buffer gate 326. A capacitor is connected between the junction of the two series resistors and ground potential. The output of the buffer gate 326 is connected through a diode 327 arranged anode to cathode to provide the excessive current signal 104.

The tray drive motion sensing stage 96 includes a latch arrangement formed by two, two-input NAND gates 330 and 332. The output of the gate 330 forms the elevate set input signal 98. The output of the gate 332 is connected to one input of the gate 330. The output of the gate 330 is also connected to one input of the gate 332. The second input of the gate 332 is connected to the elevate mode enable signal 84. The second input of the gate 330 is connected through a resistor 334 to the output of the amplifier 336. The second input of the gate 330 is also connected through a capacitor 338 to ground potential. The noninverting input of the amplifier 336 is connected through the series combination of a diode 340 arranged cathode to anode and a resistor 342 to the tray motor drive signal 86. Similarly, the inverting input of the amplifier 336 is connected through a diode 344 arranged anode to cathode to the junction of the resistor 342 and the diode 340.

The aperture center detector stage 123 includes an amplifier 331 having a noninverting input connected through a series resistor to the photodetector output 94b and an inverting input connected through a series resistor to the photodetector output 94a. The output of the amplifier 331 is connected through a series resistor 333 to the anode of a first diode 335 and to the cathode of a second diode 337. The cathode of the diode 335 is connected to the inverting input of an amplifier 339. The anode of the diode 337 is connected to the noninverting input of the amplifier 339. The output of the amplifier 339 is connected through the series combination of a capacitor 341 and a resistor 343 to the control output 157.

Considering now the operation of the control apparatus 10 of FIG. 4 and referring additionally to the timing waveform diagram of FIG. 10, operation proceeds with the initiation of the slide advance control signal; for example, a forward advance signal transition on the forward control line 26a from a high level to a low level. In response to the low level at line 26a, the transistor 162 is turned off and the signal at 52a is a high transition signal.

For a single slide advance the result at 52a is a short durational high transition signal. For the rapid search and random access modes to move the slide tray a number of slide tray positions, the signal at 52a is maintained at a high transition level for a period of time corresponding to a desired number of slide positions as determined by the slide count signal 100.

In response to the high transition at 52a, the latch formed by gates 166 and 168 in the forward/reverse logic stage 50 is latched in the forward mode with a high level at output 170. Further, the high transition signal at 52a is coupled through the gate 182 of the elevate set reset gating stage 110 and through the capacitor 184 with the gate 186 providing a high transition pulse to the gate 208 and the elevate drive latch 112. The result is the setting of the elevate drive latch 208 to the elevate latch condition with a high output at 138 of the gate 210 coupled to the gate 114 of the elevate tray interlock 114. This results in the elevate motor drive amplifier stage 60 being actuated to control operation of the slide elevate motor 64 to elevate the slide from the projection position to the upward slide tray position.

When the slide elevate mechanism 68 reaches the predetermined up-limit position, the up-limit switch 140 is actuated and a low going transition signal is supplied on line 72a to the gate 232 of the elevate switch debounce stage 116. The transition on line 72a latches the arrangement of gates 232 and 234 and a pulse signal is supplied at output 148 through the capacitor 238. A pulse signal is also transmitted through the OR gate 242 to the common switch transition output line 144. A pulse on the signal line 144 is coupled through the gate 194 to reset the elevate drive latch 208 and thus terminate operation of the slide elevate motor 64 through the elevate tray interlock gate 114 of the elevate motor drive amplifier 60.

The pulse on the signal line 148 is coupled to the gate 270 of the tray drive latch stage 120 whereupon the latch is set to the tray drive mode with a high output at the control signal output 150. With two high level inputs to the AND gate 174 of the tray motor direction mode control stage 118, the gate 174 is enabled to provide at 80a a forward tray drive control signal to the tray motor drive amplifier stage 82. Thus, operation of the slide tray motor 88 is accomplished to move the slide tray from one slide position toward the next slide position.

In the case of a single slide advance control signal being applied to the forward/reverse logic stage 50, the forced mode sustaining signal 152 is a low level at this time. Thus, as the photodetectors 126 and 128 begin to conduct as the aperture 132 nears alignment with the detecting station of the source 124 and the photodetectors 126, 128, the current sensed through the resistor 264 by the amplifier 258 results in a pulse signal through gate 250 as a negative going transition signal to the input of the gate 252. The output of the gate 252 provides a positive going pulse transition signal to the gate 268 of the tray drive latch thereby resetting the latch and terminating the force mode drive signal at 150. The time of transition from the forced mode to the servo mode in terms of aperture alignment relative to the photodetector at the detecting station is varied by the control apparatus 10 as a function of frictional tray drive loading as will be explained in more detail hereinafter.

Thus, the forward drive signal 170 from the forward-/reverse logic stage 50 is inhibited from passing through the gate 174 since the second input at 150 to the gate 174 is a low level.

Operation of the control apparatus 10 at this point terminates the forced mode of operation and enters the servo mode of operation under the control of the photodetectors 126 and 128. Thus, the tray motor drive amplifier 274 is controlled in accordance with the servo feedback signals 95a and 95b from the photodetectors 126 and 128. If the tray is being moved in the forward direction, the aperture 132 first approaches the forward photodetector 128 and thus conduction of the forward photodetector 128 initially occurs. Then as the aperture 132 moves through the center point of the detection station as measured by the line drawn between the center of the source 124 and the center of the photodetector 126 and 128, conduction of both photodetectors 126, 128 is approximately equal. Next, as the tray tends to overshoot past the center aligned position of the aperture at the detection station, the reverse photodetector 126 begins to conduct at a higher level than the forward photodetector 128 since the aperture is more nearly aligned with the reverse photodetector 126 and a greater amount of light from the source 124 impinges upon the reverse photodetector 126.

Thus, the differential outputs of the photodetectors 126 and 128 at 94b and 94a, respectively, control operation in a closed loop fashion to drive the amplifier 274 and operate the motor 88. With higher conduction in the reverse detector 126, by means of signal 94b, the polarity of output drive from the amplifier 274 at 86 reverses the motor direction. Thus, the tray is stopped with the aperture 132 aligned with the detection station and with the slide aligned with the slide elevate mechanism 68; the center of the aperture 132 being aligned with the line drawn between the midpoint of the photodetectors 126, 128 and the center of the source 124. Tray motion is sensed by the amplifier 336 of the tray drive motion sensing stage 96 in response to the voltages of the servo mode operation at the output 86 to the motor 88.

In response to the control pulses at the output of the amplifier 336, the integrator formed by resistor 334 and capacitor 338 integrates the output of the amplifier 336 to set the latch formed by gates 330 and 332 and provide a positive going transition at 98. The positive going transition at 98 is coupled through the capacitor 192 as a positive going pulse signal through the gate 186 to again set the elevate drive latch 112.

Thus, the elevate enable latch signal 138 along with the high level on the elevate enable line 84 provide a high output through the elevate/tray interlock gate 114 to provide operation of the slide elevate motor 64 whereupon the slde elevate mechanism 68 transfers the slide aligned at the slide change projection station from the tray position down to the projection position.

When the slide elevate mechanism 68 moves the slide to the projection position, the down-limit switch 142 is actuated to provide a low transition at signal line 72b to the gate 234. The gate 234 inverts the negative going transition to a positive going transition at its output. The positive going transition at the output of the gate 234 results in a pulse being generated to the input of the gate 242 by means of the capacitor 244. The positive going pulse at the output of the gate 242 at switch transition signal line 144 is coupled through the gate 194 of the elevate set reset gating stage 110 to the reset line 146 of the elevate drive latch 112 to reset the latch to the elevate disable mode.

Thus, operation of the slide elevate motor 64 is terminated with the slide in the downward projection position. The control apparatus 10 is then in a stable mode of operation in an idle state awaiting the next instruction for slide advance or reverse for a single slide or for instruction in either the rapid search mode or random access mode.

For the single slide advance situation, the signal at 52a is a short durational high transition signal. Correspondingly, the forced mode sustaining signal 152 is also a short durational signal. Thus, at the time of transition at the end of the elevate slide mode to return the slide from the projection position up to the slide tray position and before the initiation of the forced mode of tray movement, it is necessary to temporarily inhibit servo mode operation. Transition to servo mode operation at this point would maintain the tray in the present slide tray position.

For this purpose and at the transition from the slide elevate mode to the forced tray drive mode, the tray output drive signal 150 from the tray drive latch 120 through the capacitor 263 and the diode 261 provides a temporary servo inhibit control signal to the noninverting reference input of the amplifier 258. The temporary high level input to the noninverting input of the amplifier 258 ensures a steady state output of the amplifier 258. Thus, the amplifier 258 is temporarily inhibited from responding to any changes in signal level at the inverting input that might result from noises or changes in the photodetector current drain as the tray begins to move in the forced mode. After tray movement has begun and the previously aligned aperture moves away from the vicinity of the photodetectors, the temporary inhibit signal is no longer necessary and normal circuit operation resumes as described hereinbefore.

Consider now the situation where a continued high level signal at any of the inputs 14a, 14b, 26a or 26b is provided for either the rapid search or random access mode to move more than one slide position. The continued high signal at 52a or 52b through the gate 182 provides a continued forced mode sustaining signal at 152. With a high signal at 152 to the gate 252, the gate 252 will not respond to the pulse signal at the output of the gate 250 derived from the amplifier 258 in response to conduction of the photodetectors as the tray moves the apertures past the photodetectors from slide position to slide position. Thus, a negative going transition will not be passed through the gate 252 and the output at 158 will remain at a low level to the gate 268.

Thus, the tray drive mode select latch 120 will remain in the forced tray drive mode with the signal 150 being continually supplied as long as one of the drive signals 52a or 52b remains in the high state. The high tray drive signal 150 disables the servo mode signals from the photodetectors in the tray motor drive stage 82 through the transistor 178.

Thus, for random access or rapid search mode, after the elevate sequence is accomplished to elevate the slide from the projection position to the slide tray position, the slide tray is rotated to the desired slide position before the drive signal 52a or 52b is terminated and before servo mode operation begins to accurately stop the tray at the desired position.

Considering now the operation of the control apparatus to vary the point of transition from the forced mode to the servo mode as a function of frictional tray drive loading, the control output 155 of the tray drive motor current sensing stage 102 provides a varying reference signal at the inverting input of the amplifier 258 of the tray reset gating stage 122 as a function of the sensed current of tray drive motor 88.

As the current of the tray drive motor increases, the amplifier 320 and the transistor 324 are effective to vary the current through the resistor 264 to result in an increased voltage level at the inverting input of the amplifier 258. Thus, the higher the frictional loading on the tray drive motor 88, the higher the reference level at the inverting input of the amplifier 258.

The point of transition from the forced mode to the servo mode is defined by the voltage level at the inverting input of the amplifier 258 dropping below the fixed reference level at the noninverting input.

Figure 11:
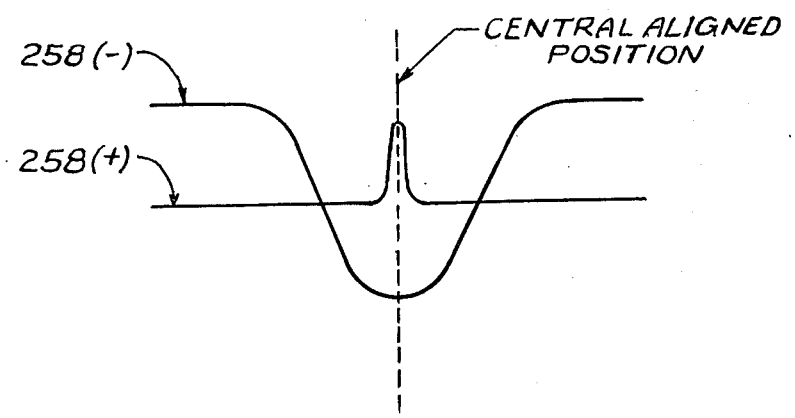
FIGS. 11 and 12 are graphic representations illustrating signal waveforms of the operation of the control apparatus for varying load conditions of the slide tray drive arrangement.

In the situation where light frictional loading is present, FIG. 11, the control signal at 155 is essentially inoperative and the point of transition to servo mode operation is governed predominantly by the current sourced through the resistor 264 to the photodetectors 126,128 through the line 156. Thus, as the aperture approaches the first photodetector and the photodetector begins to conduct, the transition from the forced mode to the servo mode occurs before the aperture reaches the aligned position centrally between the photodetectors 126, 128. This is desirable in light frictional loading situations, since the tray will tend to overshoot the center aligned position and the driving forces in the servo mode are sufficient to control movement of the slide tray past the transition position.

In the case of higher frictional loading, the point of transition from the forced to the servo mode should be nearer the center aligned aperture position between the photodetectors at the detection station since the inertia of the tray may not be great enough under high friction, slower drive conditions to allow the tray to move past the earlier transition position to the center position. Further, in some circumstances of extremely high frictional loading, the servo drive forces alone may not be adequate to move the tray to the center aligned position. This situation is encountered when the slide tray is deformed.

Thus, in high frictional loading situations, the control signal 155 raises the normal bias level at the inverting input of the amplifier 258 such that a larger conduction current is required by one photodetector to bring the inverting input below the noninverting input. This results in a transition from the forced mode to the servo mode corresponding to a slide tray position with the aperture being nearer the central aligned position at the detection station.

Figure 12:
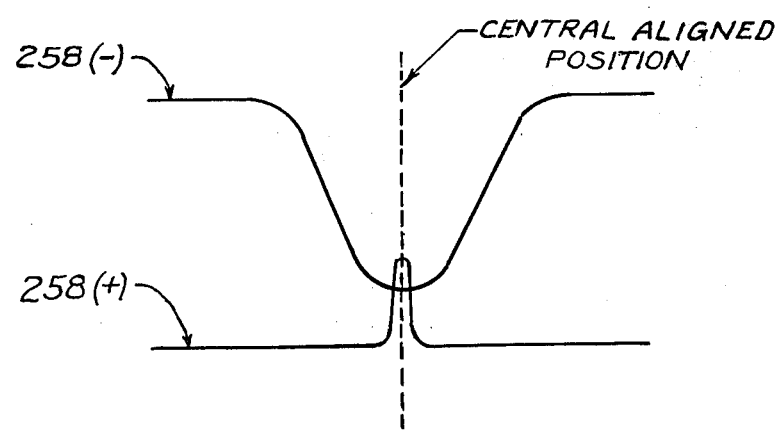

In order to ensure transition from the forced mode to the servo mode in situations of extremely high frictional loading on the tray drive motor 88, FIG. 12, the control output 157 of the aperture center detector 123 is active at the center aligned aperture position. The control output 157 at the center aligned aperture position provides an increased level at the noninverting input of the amplifier 258 at the time of center aperture alignment. Thus, for high frictional loading situations, this ensures that the level at the inverting input will be below the reference level at the noninverting input to provide the transition from the forced mode to the servo mode. Of course, the control output 157 would be necessary only in situations of extremely high frictional loading on the slide tray drive motor.

Considering operation of the tray motor drive 82 and specifically electronic braking action performed during the forced mode operation, as the amplifier 274 provides a drive signal to the push-pull transistors 282, 284 to provide the motor drive output at 86, the capacitor 292 in the feedback circuit of the amplifier 274 is appropriately charged. For example, if the control apparatus 10 conditions the tray motor drive stage 82 to the forced forward drive mode, the capacitor 292 will become positively charged to a level dependent upon the output drive control voltage of the amplifier 274.

As the forced mode of operation is terminated and the servo mode of operation begins, the forced forward mode drive signal 80a is removed and the servo feedback signals 95a, 95b control servo mode operation of the amplifier 274 to control operation of the motor 88. Upon the termination of the forced mode, the stored charge on the capacitor 292 provides a braking signal at the inverting input of the amplifier 274 to provide a control voltage at the output of the amplifier 274 to brake operation of the motor 88 by the provision of a brake voltage level opposite in sign to the control voltage during forced mode operation.

For example, after the forced forward mode has been terminated, a negative control voltage output of amplifier 274 is obtained and the push-pull transistors 282, 284 provide a braking signal at 86 to the motor 88.

In response to the dynamic operating characteristics of the motor 88, the braking action proportionally increases with the speed of the motor and proportionally decreases with the load on the motor. This is accomplished in response to the drive voltage level at 86 and the RC time constant provided by resistor 290 and capacitor 292. For example, if the motor is heavily loaded, the control voltage 86 tends to drop and then the charge on the capacitor 292 also drops. When the motor 88 is operating at high speeds in response to a control voltage at 86 for a relatively long time duration in the rapid search mode or random access mode, the capacitor 292 receives a higher charge and thus provides a higher degree of braking.

Further in the forced reversed mode of operation, the capacitor 292 also stores a negative voltage for application to the amplifier 274 to provide braking operation by applying a forward drive signal at the output of the amplifier 274. Similarly, the elevate motor drive stage 60 also provides electronic braking action of the elevate slide motor 64 through the provision of the capacitor 230.

Figure 3:
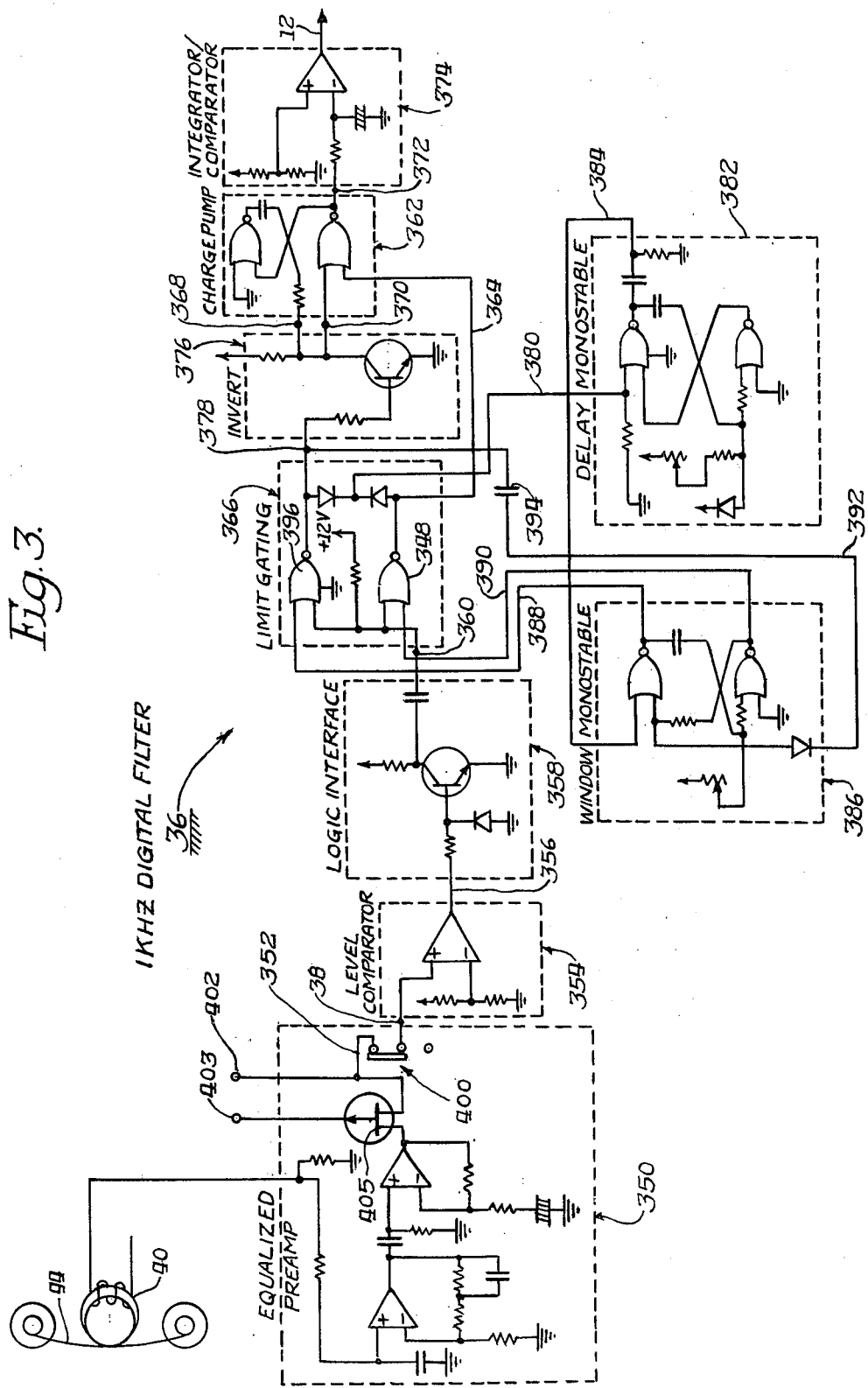
FIG. 3 is a logic and schematic diagram of a tray advance detection circuit of the control apparatus of FIGS. 1 and 2.

Referring now to FIG. 3 and considering now a specific embodiment of the digital filter 36 of FIG. 1, the digital filter 36 responds to the 1 KHz signal sine wave and encoded tape advance signals at the audio input 38 to provide the advance control signal 12. In a specific arrangement compatible with recognized standards, the encoded advance bursts are recorded as 1000 Hz. signals of predetermined time duration on the program cassette tape 44 with a burst being recorded where slide advance is desired during the program tape.

The equalized preamp stage 350 amplifies the input signal from the tape head 40 and provides the output 352 to the digital filter 36 as discussed hereinbefore.

The digital filter 36 includes a level comparator stage 354 having an input connected to the output 38 of the equalized preamp stage 350. The level comparator stage 354 provides an output at 356 when the signal at 38 exceeds a predetermined peak amplitude. The output 356 of the level comparator stage 354 is connected to a logic interface stage 358 that provides an output at 360 as a negative going logic level pulse in response to each positive going crossover of the signal at 356.

A charge pump stage 362 of the digital filter 36 includes a reset input 364 supplied from an output of the limit gating stage 366. The charge pump stage 362 also includes trigger inputs 368 and 370. The charge pump stage 362 includes an output 372 connected to drive an integrator/comparator stage 374. The output of the integrator/comparator stage 374 provides the advance control signal 12. The output 372 of the charge pump stage 362 is averaged by the integrator/comparator stage 374 with signal frequencies in the acceptance band of the digital filter 36 resulting in a high enough level to trigger the integrator/comparator stage 374. The output 12 is normally near the +12 V supply voltage and when the integrator/comparator stage 374 is triggered, the output 12 drops to a level near the −12 V supply. An inverter stage 376 provides the trigger signals 368, 370 in response to the trigger signal output 378 of the limit gating stage 366.

The limit gating stage 366 also includes a trigger output signal 380 that is active in response to negative going signal crossovers at the input 360 to the light gating stage 366. The trigger signal 380 is connected as a trigger input to a delay monostable stage 382. When triggered, the delay monostable stage 382 generates an output at 384 having a period equal to the period of the upper frequency limit of the acceptance band of the encoded tone burst. The output 384 of the delay monostable stage 382 is connected as a trigger input to a window monostable stage 386. The window monostable stage 386 is triggered by the trailing edge of the output 384 of the delay monostable stage 382. The window monostable stage 386 includes time enabled control outputs 388, 390 connected to control the limit gating stage 366. The window monostable stage 386 also includes a reset input 392 connected to the trigger output 378 of the limit gating stage 366 through a capacitor 394.

In operation, during the enabled period of the window monostable stage 386, the limit gating stage 366 includes a two-input NOR gate 396 that is enabled by the control line 388. Thus, if the input at 360 is negative going during this enabled period, a pulse will be passed through gate 396 to the trigger input 368, 370 of the charge pump stage 362 through the inverter stage 376. Thus, the charge pump stage 362 is retriggered in this manner.

If the signal at 360 is of different frequency, the pulse generated during the negative going portion of the signal will be gated through a second gate 348 of the limit gating stage 366 and connected to the reset input 364 of the charge pump stage 362 and thus reset the charge pump.

The equalized preamp stage 350 includes a burst defeat switch arrangement 400. The burst defeat switch 400 in the position illustrated in FIG. 3 connects the amplified signal at 352 in equalized preamp 350 to the output 38 for processing by the level comparator stage 354 of the digital filter 36. In a second operative position, the burst defeat switch arrangement 400 disconnects the signal 352 from the output 38 to disable operation of the digital filter 36. The burst defeat switch position is utilized in a situation where the projection apparatus is to be made nonresponsive to the burst encoded signals on the tape 44. Further, in projection apparatus utilizing a CPU controller 24, the burst defeat switch 400 in the second position disables the input 25a to the CPU controller 24 by disconnecting the signal 352 from the output 25a.

An additional signal input 402 is provided at the output 352 of the equalized preamp stage 350 for purposes of obtaining an advance signal 12 from the digital filter 36 for slide advance operation during generation of program advance signals when recording a program tape 44 in projection apparatus not utilizing a CPU controller 24. Thus, the circuitry of the projection apparatus for encoding burst signals (not shown) is utilized to produce input signals at 402 to provide the advance signal 12 by means of the digital filter 36 and to advance the slide tray through operation of the control apparatus 10 during recording of the program. A defeat signal 403 is connected to disable a FET gate 405 of the preamp stage 350 during the encoding of burst signals thereby disabling the output of the preamp stage 350 at 352.

Referring now to FIGS. 5, 6, 7 and 8, the slide tray drive and turntable arrangement 90 and the tray position sensing arrangement 92 are illustrated in operative relationship. The turntable 412 carries the circumferential coded aperture ring 130 shown in more detail in FIGS. 7 and 8. The slide tray position sensing arrangement 92 is slidably carried by the housing 414 of the projector apparatus. The turntable 412 is carried by the housing 414 for rotary movement relative thereto. A gear ring 416 is integrally provided on the turntable 412 for engagement by a drive gear (not shown) driven by the slide tray motor 88. A slide tray 410 positioned atop the projection apparatus includes a registration notch 417 (FIG. 6) formed in the outer lip portion 418. The registration notch 417 interfits with a cooperating nose portion 419 of the turntable 412 for driving of the slide tray 410 by the turntable 412 and to provide proper registration of slide tray position with the turntable. Since the turntable 412 and the tray position sensing arrangement 92 provide only incremental slide position information, a zero position registration switch (not shown) is provided adjacent an actuating portion of the turntable 412 to provide zero absolute starting position information to the control apparatus 10 and the CPU controller 24.

The turntable 412 with the attached aperture ring 130 provides a circumferential space or cavity 420 (FIG. 8). The position sensing arrangement 92 includes a light pipe 422 (FIGS. 5 and 6) that cooperate with the light source 124 and extends into the cavity 420 for directing light from the source 124 onto the aperture ring 130. The photodetectors 126, 128 are mounted in the position sensing arrangement 92 in a common detector module 424 immediately below the aperture ring 130.

Figure 9:
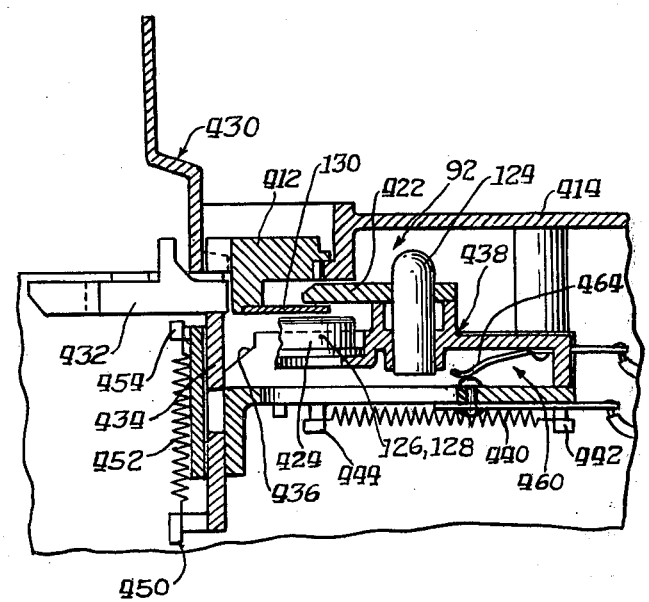
FIG. 9 is a sectional view similar to FIG. 6 and illustrating operation of the slide position sensing arrangement with a different slide tray.

The aperture ring 130 includes a first circumferential array 426 of apertures 132 including 81 apertures appropriately and equally spaced to correspond to the 81 positions of an 80 slide tray 410. The aperture ring also includes a second circumferential array 428 of apertures 132 including 141 apertures appropriately and equally spaced to correspond to the 141 positions of a 140 slide tray 430 (FIG. 9). With the 80 slide tray 410 in position as shown in FIGS. 5 and 6, the first array 426 of apertures 132 is directly aligned over the photodetectors 126, 128 as the slide tray 410 and the turntable 412 are rotated.

In a specific embodiment the photodetectors 126, 128 are implemented by chips that are each 0.050 by 0.165 inches arranged with the 0.165 dimensions along the circumferential path of travel of the aperture array 426. The detector module 424 provides a 0.020 inch space between the adjacent chips. Further, the apertures 132 are 0.070 by 0.070 inch formed in a stainless steel aperture ring 130.

Referring now to FIG. 9, a commercially available 140 slide tray 430 conventionally includes a downwardly extending portion 432 provided as a portion of a tray release mechanism. The movable sensing arrangement 92 includes a spring biased cam actuator 434 that is actuated by the extending portion 432. Upon downward movement of the cam actuator 434, the cam actuator operates a cam surface 436 of a spring biased platform 438 carrying the light source 124, the detector module 424 and the light pipe 422 of the position sensing arrangement 92. Thus, the movable platform 438 is positioned to the right in FIG. 9 into the 140 slide tray sensing position in reponse to the operation of the cam actuator 434 by the extending portion 432.

The position sensing arrangement 92 in the 140 slide tray sensing position of FIG. 9 accurately aligns the photodetectors 126, 128 with the path of travel of the aperture array 428. Thus, the photodetectors 126, 128 are appropriately positioned to cooperate with the apertures 132 of the 141 aperture array 428 to provide feedback signals to the control apparatus 10 for 140 slide tray position sensing and servo operation as discussed hereinbefore.

The movable platform 438 of the position sensing arrangement 92 is normally biased to the 80 slide tray sensing position by means of a spring 440 connected between an extending hook portion 442 of the platform 438 and an extending hook portion 444 of a U-shaped channel housing generally referred to at 446, 448 and mounted to the housing 414. The platform 438 is slidably mounted for movement within the U-shaped channel housing 446, 448. The cam actuator 434 is formed with an aperture to allow receiving of the cam surface 436 of the platform 438. The lower portion of the cam actuator 434 includes an extending hook portion 450. A spring 452 is connected between the hook portion 450 and an extending hook portion 454 of the U-shaped channel housing 446, 448 so as to bias the cam actuator 434 to the upward position. The cam actuator 434 is slidably mounted within the U-shaped channel housing 446, 448 between the respective upper and lower positions of FIGS. 6 and 9 within the channel formed by housing portions 456, 458.

A switch contact arrangement 460 provides a closed circuit to the control apparatus 10 when the slide tray position sensing arrangement is in the 140 slide tray position and an open circuit when the sensing arrangement is in the 80 slide tray position. The switch contact arrangement 460 includes a first fixed contact 462 carried by the lower housing portion 458. A movable spring contact arm 464 is carried by the movable platform 438. The spring contact arm 464 is arranged to contact the fixed contact 462 whenever the platform 438 is moved to the 140 slide tray position as shown in FIG. 9. The fixed contact arm arm 462 and the spring contact arm 464 are respectively connected to output signal connections 466, 468 for use by the CPU controller 24 at 558.

Reference may be made to copending application Ser. No. 336,466 filed by N. Mischenko on Dec. 31, 1981 for a more detailed discussion of the movable sensing position arrangement 92.

In an alternate arrangement, the movable sensing arrangement 92 is controlled by a switch operated by the user to select either 80 slide tray operation or 140 slide tray operation. The sensing arrangement 92 under the control of the switch is then moved by a suitable actuator such as a solenoid.

In another arrangement, two detection assemblies are provided, each aligned with a respective one of the aperture arrays 426, 428. Thus, 80 slide tray operation is performed utilizing the outputs of the detection assembly aligned with the 80 slide tray aperture array 426 and 140 slide tray operation is performed utilizing the output of the detection assembly aligned with the 140 slide tray aperture array 428. The appropriate detection assembly is selected by a suitable switching arrangement. The switch arrangement is controlled by a user operated switch for either 80 slide tray or 140 slide tray operation. Either the outputs of the detection assemblies or the energy input to the detection assemblies may be switched in various embodiments.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Control apparatus for slide projector apparatus comprising:
   drive transport means for carrying a slide tray including a plurality of slide positions and for selectively moving said slide tray to align said slide positions at a slide change station;
   means for detecting the position of said drive transport means, said detecting means comprising means responsive to the position of said drive transport means for generating feedback signals representing the degree of alignment between each of said slide positions and said slide change station when each of said slide positions is within a predetermined positional range of said slide change station;
   means for generating a slide movement signal; and
   drive transport control means responsive to said slide movement signal and said feedback signals for controlling operation of said drive transport means.

2. The control apparatus of claim 1 wherein said detecting means further comprises means for defining an array of equally spaced apertures, said array of apertures including one aperture corresponding to each of said slide positions in said slide tray, said array defining means being moved by said drive transport means along with said slide tray.

3. The control apparatus of claim 2 wherein said detecting means further comprises light source means positioned on one side of said aperture array defining means, said feedback signal generating means comprising two photodetectors arranged along the path of travel of said aperture array and on the other side of said aperture array such that illumination from said light source means impinges on both of said photodetectors when an aperture is directly aligned over the center point midway between said two photodetectors.

4. The control apparatus of claim 3 wherein said aperture array and said photodetectors are arranged in a predetermined relationship such that said photodetectors receive unequal illumination from said light source when an aperture is not centered over said midpoint of said two photodetectors and when said aperture is within a predetermined positional range on either side of said center point.

5. The control apparatus of claim 4 wherein said photodetectors receive no illumination from said light source through said aperture when none of said apertures is within a predetermined positional range of said center point of said two photodetectors.

6. The control apparatus of claim 4 wherein said drive transport control means comprises servo control means responsive to the differential output of said photodetectors for determining the direction of travel of said drive transport means.

7. The control apparatus of claim 6 wherein said drive transport control means further comprises forced movement control means responsive to said slide movement signal for controlling operation of said drive transport means and disabling operation of said servo control means.

8. The control apparatus of claim 7 wherein said drive transport control means further comprises mode control means responsive to the energization of said photodetectors for terminating operation of said forced movement control means and enabling operation of said servo control means.

9. The control apparatus of claim 3 wherein each of said photodetectors comprises a photodetector chip having predetermined chip dimensions, said photodetector chips being disposed with a predetermined spacing between said chips, said apertures comprising predetermined dimensions, said photodetector chip dimensions and spacing and said aperture dimensions being related to provide predetermined unequal illumination characteristics to said photodetector chips when each of said apertures is within a predetermined range of the center point between said photodetector chips.

10. The control apparatus of claim 9 wherein said photodetector chips are fabricated as a single device array, said device array including a housing for mounting and enclosing said photodetector chips, the enclosure surface of said housing parallel to and immediately disposed above said photodetector chips being fabricated from light transmisive material.

11. The control apparatus of claim 8 further comprising slide elevating means disposed at a predetermined slide change station for controlling the transfer of a slide at said slide change station between said slide tray and a projection position for projecting an image of said slide.

12. The control apparatus of claim 11 wherein said drive transport control means further comprises slide elevate control means for controlling operation of said slide elevating means, said slide elevate control means being responsive to said forced movement control means upon initial receipt of said slide movement signal to transfer the slide presently in said projection position to said slide tray position, said slide elevate control means generating an enable signal to condition said drive transport control means to initiate operation of said drive transport means after completion of said slide transfer to said slide tray.

13. The control apparatus of claim 12 wherein said drive transport control means further comprises means for sensing completion of slide tray movement to a desired slide position and for generating an enable signal to said slide elevate control means, said slide elevate control means controlling said slide elevate means to transfer the slide at said projection position from said slide tray to said projection position.

14. The control apparatus of claim 1 wherein said drive transport control means comprises drive amplifier means and a drive input signal, said drive amplifier means generating a drive transport signal to operate said drive transport means in response to said drive input signal, said drive amplifier means comprising electronic brake signal developing means for generating an electronic brake signal applied as a brake input signal to said drive amplifier after termination of said drive input signal.

15. The control apparatus of claim 14 wherein said electronic brake signal developing means comprises a resistive-capacitive network connected to receive said drive transport signal as an input.

16. The control apparatus of claim 12 wherein said slide elevate control means comprises drive amplifier means and a drive input signal, said drive amplifier means generating a drive elevate signal to said slide elevating means in response to said drive input signal, said drive amplifier means comprising electronic brake signal developing means for generating an electronic brake signal applied as a brake input signal to said drive amplifier after termination of said drive input signal.

17. The control apparatus of claim 16 wherein said electronic brake signal developing means comprises a resistive-capacitive network connected to receive said drive elevate signal as an input.

18. The control apparatus of claim 8 wherein said mode control means comprises means responsive to the load on said drive transport means for varying the point of termination of operation of said forced movement control means and the enabling of said servo control means in accordance with the load on said drive transport means.

19. The control apparatus of claim 18 wherein said load responsive means comprises means for terminating operation of said forced movement control means and for enabling said servo control means at a point nearer alignment of said aperture over the midpoint of said photodectors as the load on said drive transport means increases.

20. The control apparatus of claim 18 wherein said drive transport means comprises a drive motor and wherein said load responsive means comprises means for sensing the current of said drive motor, said current sensing means comprising means for generating a control signal representative of the load on said drive transport means, said mode control means further comprising termination control means responsive to said control signal and the energizing current of said photodetectors for terminating operation of said forced movement control means and enabling operation of said servo control means.

21. The control apparatus of claim 20 wherein said termination control means comprises comparator means for comparing a DC reference signal and a combined signal including said control signal and a photodetector signal, said photodetector signal being proportional to the current through said photodetectors, said comparator means providing a termination signal when said combined signal and said DC reference signal satisfy a predetermined relationship.

22. The control apparatus of claim 21 wherein said control signal varies the signal level to said comparator means, said control signal shifting the DC bias level of said combined signal in a manner generally proportional to said current of said drive motor.

23. The control apparatus of claim 22 wherein said mode control means further comprises aperture alignment detection means for providing a shifted DC reference signal to said comparator means when said aperture is in the aligned position approximately midway between said two photodetectors.

* * * * *

UNITED STATES PATENT AND TRADEMARK OFFICE
CERTIFICATE OF CORRECTION

PATENT NO. : 4,432,618
DATED : February 21, 1984
INVENTOR(S) : Robert R. Parker and Rudolph Starai It is certified that error appears in the above-identified patent and that said Letters Patent are hereby corrected as shown below:

Column 7, line 12, change "the"(first occurrence) to --The--;

Column 8, line 11, correct spelling of "stage";

Column 8, line 12, after "in", insert --response--;

Column 9, line 63, after "stable", change "ready" to --steady--;

Column 11, line 15, correct spelling of "transition";

Column 12, line 29, after "amplifier", change "268" to --258--;

Column 16, line 5, correct spelling of "slide";

Column 19, line 43, change "light" to --limit--;

Column 22, line 12, after "contact", delete "arm arm"; and

In Claim 5, line 3, after "through said", change "aperture" to --apertures--.

Signed and Sealed this

Nineteenth Day of March 1985

[SEAL]

Attest:

DONALD J. QUIGG

Attesting Officer    Acting Commissioner of Patents and Trademarks